United States Patent [19]
Kerkhoff et al.

[11] Patent Number: 5,424,957
[45] Date of Patent: Jun. 13, 1995

[54] ACCURATE METERING AND CONTROL SYSTEM AND METHOD FOR LIVESTOCK FEEDING OPERATION

[75] Inventors: Gary N. Kerkhoff; Denis M. Schuette; James V. Long, all of Dodge City; Thomas E. Sehl, Ness City; Galen W. Durr, Dodge City, all of Kans.

[73] Assignee: Info Tech, Dodge City, Kans.

[21] Appl. No.: 133,554

[22] Filed: Oct. 7, 1993

[51] Int. Cl.⁶ .................. G06F 15/18; A01K 5/00
[52] U.S. Cl. .................. 364/479; 364/424.07; 119/51.02
[58] Field of Search ............ 364/413.01, 424.07, 364/479, 555, 167.01, 148, 509, 510; 119/51.01, 51.02; 222/650

[56] References Cited

U.S. PATENT DOCUMENTS

| | | | |
|---|---|---|---|
| 4,141,321 | 2/1979 | Wolf | 119/56.1 |
| 4,523,280 | 6/1985 | Bachman | 364/424.07 |
| 4,762,552 | 8/1988 | Hyer et al. | 222/56 |
| 4,803,626 | 2/1989 | Bachman et al. | 364/424.07 |
| 4,907,538 | 3/1990 | Helmle et al. | 119/51.01 |
| 5,008,821 | 4/1991 | Prah et al. | 364/413.01 |
| 5,081,600 | 1/1992 | Tump | 364/571.08 |
| 5,103,401 | 4/1992 | Johnson | 364/479 |

FOREIGN PATENT DOCUMENTS

| | | |
|---|---|---|
| 0231043 | 8/1987 | European Pat. Off. |
| 0829060 | 5/1981 | U.S.S.R. |
| 0904618 | 2/1982 | U.S.S.R. |
| 0967424 | 10/1982 | U.S.S.R. |
| 0988253 | 1/1983 | U.S.S.R. |

*Primary Examiner*—Paul P. Gordon
*Attorney, Agent, or Firm*—Litman, McMahon and Brown

[57] ABSTRACT

A comprehensive and accurate feed rate monitoring and control system and method for livestock feeding operations includes a central programmable controller mounted in a feed distributing truck into which is input specific information for each livestock pen and associated feed bunk. This information includes the pen number, the length of the feed bunk, any unusual pen configuration and the amount of feed to be distributed in each bunk. The computer then calculates initial set points for vehicle speed and/or discharge door opening, taking into account the bunk length and any special pattern feeding criteria due to pen configuration. The system can display these set points for manual control or the feed truck optionally includes an accurate ground speed sensor or truck position sensor and an accurate feed rate sensor, which can be a load cell mounted on the feed chute itself. Once a feed run is commenced along a specific bunk, the controller provides real time monitoring of vehicle speed and feed rate, constantly recalculating the amount remaining to be fed and the length remaining to the end of the bunk, which variables are then used to update and adjust the set points for vehicle speed and/or discharge opening.

45 Claims, 5 Drawing Sheets

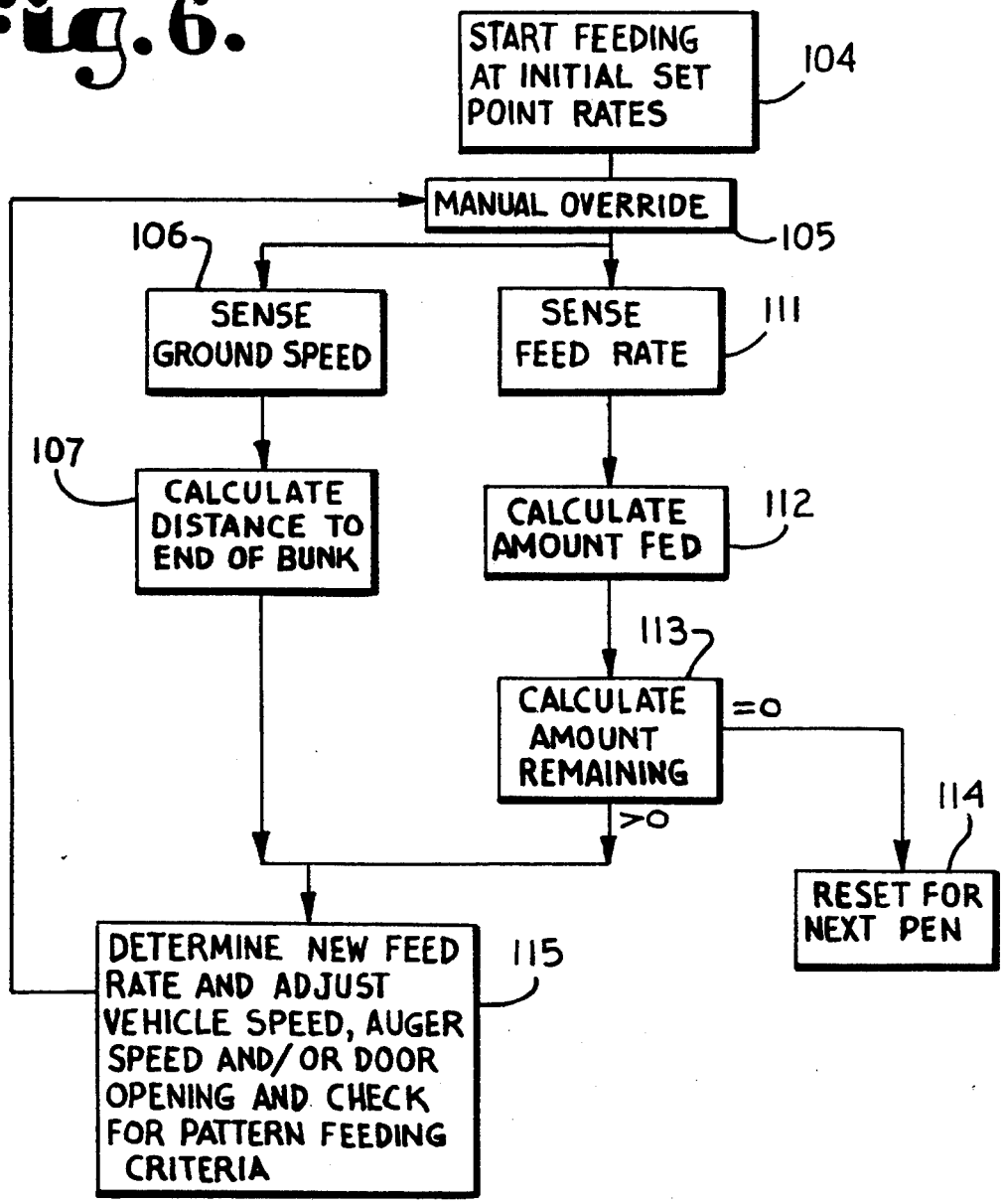

ACCURATE METERING AND CONTROL SYSTEM AND METHOD FOR LIVESTOCK FEEDING OPERATION

BACKGROUND OF THE INVENTION

1. Field of the Invention

The present invention relates generally to a system for accurately metering and controlling the amount of feed distributed to feed bunks in a livestock feeding operation such as a feedlot. More particularly, the inventive system allows precise computer control of a feed distributing vehicle so that feed is uniformly distributed in bunks of various lengths serving feedlot pens of varying configurations.

2. Description of the Related

A large percentage of production beef cattle and other livestock are fed by commercial feedlot operators. These businesses often constitute independent operations which accept cattle from farmers or ranchers at a certain age and size and feed them until they reach a size at which they are ready for slaughter. In return, the farmer or rancher pays a rental fee for space and care in the feedlot pen and for the feeding costs plus operating profit of the feedlot.

In the feedlot, cattle are grouped in pens according to their feed requirements, e.g. cattle of a like age and size should be fed the same ration in the same amount. Feeding is accomplished by driving a feed truck or other feed distributing vehicle along feed "bunks" which extend continuously along one or more sides of each pen. The cattle are generally fed several times daily and it is very important for uniform growth and health that each animal receive the assigned ration each day. This not only means that the proper total amount of feed must be distributed to each pen each day, but that the feed must also be evenly distributed throughout the bunk. This is due to the fact that cattle are creatures of habit and therefore they have a strong tendency to feed from the same place in the bunk each time. Thus, each animal must have its proportion of the total bunk feed available to it within its immediate feeding area in order to maximize consumption.

Typically, commercial feedlots have distributed feed via feed trucks which are driven along each feed bunk. Each truck has a feed storage hopper mounted on it which is connected to a feed distributing chute via a hydraulically and/or manually controlled door. Often a feed transfer auger is positioned to lift feed from the hopper door opening to the distributing chute. The rate at which feed is distributed thus depends upon the ground speed of the truck, the speed of the transfer auger and the positioning of the door. The truck driver is given a listing of pen numbers and feed amounts to be distributed to each pen in his route. It is up to the driver, based upon experience and "feel", to open the chute door the requisite amount and to drive the truck the correct speed to distribute the assigned feed amount evenly throughout each bunk.

The rate of feed distribution is often displayed to the driver on a display, but the feed rate is usually derived via a plurality of load cells placed beneath the feed hopper on the truck. These load cells convert the weight of the hopper to an electrical signal which is sent to a monitoring scale. There are often four load cells, one positioned at each corner of the hopper, and the scale monitors each load cell and derives a total weight for the hopper and feed contained therein by accumulating the weight information forwarded from each load cell. When the known empty weight of the hopper is subtracted out, the weight of feed remaining is displayed to the driver.

The problems inherent in the prior art approach are numerous. Under ideal conditions, each pen would be identical in size and shape and each bunk would be identical in length. However, feedlots are seldom constructed under ideal conditions, and, furthermore, the original design conditions are subject to constant change. Topography often dictates that pens will vary in size and shape, and, therefore, the lengths of bunks will vary. The positioning of gates and other pen construction considerations often shorten the length of a bunk serving a particular pen relative to even other pens of identical construction. It is difficult or impossible for a typical feed truck driver, even if he is aware of these bunk length variations, to properly compensate for them by adjusting the feed rate and/or vehicle ground speed. This inability to properly adapt feed rate to bunk length often results in a driver dispensing the total feed amount over less than the total bunk length. Alternatively, a driver will often reach the end of the bunk without having distributed the requisite feed amount. This means that he will need to shut off the feed door, back up the truck, reopen the feed door and distribute the remainder of the bunk allotment over a small portion of the bunk. Furthermore, this requirement to back up and retrace a portion of the bunk, when repeated many times per day, greatly adds to the time and expense of feed distribution. It has been estimated by some feedlot operators that fully 50% of a driver's feeding time is spent backing up and covering bunk lengths twice. This situation also increases fuel consumption and adds to vehicle maintenance expense by causing increased wear on brakes, transmissions, tires, etc.

Another problem with prior art distribution systems is the imprecision with which feed rates and vehicle speeds are monitored. Load cells positioned beneath a hopper give a fairly accurate reading of the total feed amount in the hopper when the feed truck is not in motion. However, when the truck is in motion, particularly on the rotted and/or muddy road conditions which often occur in feedlots, the inertial effects of constant swaying and jolting, starting and stopping, and acceleration and deceleration of the truck causes the load cells to be constantly differentially loaded and unloaded. The result is that the amount of feed sensed by a connected scale can vary instantaneously by several hundred pounds. It is readily apparent that a feed rate derived from such an inaccurate weighing system will itself be subject to large inaccuracies. One approach of past distributing systems has been to provide limits to the feed rate swings sensed by load cells by providing synthesized high and low rate change limits. One example of such a system is taught in U.S. Pat. No. 4,762,252 to Hyer et al. In this patent, the synthesized rate change is maintained until the sensed feed rate returns to a normal range. Unfortunately, with rough road conditions, this can take several seconds during which the truck driver is being fed erroneous rate information.

For truck speed sensing, feedlot operators often simply use the standard track speedometer or tachometer. However, feed trucks during a bunk distribution run usually travel at speeds better measured in feet per minute, i.e. speeds which may not even register on a standard speedometer and engine speed variations which may not be accurately reflected on a tachometer. This requires a driver to establish and vary his truck speed by feel and experience. This is not only an extremely inaccurate method of speed regulation, but also requires unacceptable training times for feed truck drivers, otherwise relatively low skill and low pay positions with consequent high turnover rates. It has been estimated that a typical driver can be trained to "know" the feedlot, bunk routing etc. within a week, but that it takes upwards of three months to train a driver to obtain the feel of a vehicle to a point where he can adequately distribute feed to the various bunks on his route. Furthermore, there are a large number of different manufacturers of feed trucks, with some manufacturers making several different models. Consequently, a single feedlot often operates two or more different types of feed trucks. Often the trucks are different enough that a driver must be virtually totally retrained on each truck model. These extensive training times and costs and the inconsistent feeding during training, exact an intolerable cost from the average feedlot.

It is clear then that a need exists for a system which is capable of reliably and effectively monitoring the feed rate and feed vehicle speed for a cattle feeding operation. Such a system should provide for the input of custom feeding instructions to accommodate varying pen configurations and bunk lengths and should reliably provide for consistent control of the feed rate and vehicle speed to allow the allotted feed amount to be evenly distributed throughout each bunk. Furthermore, in addition to providing information which allows the driver to precisely control the vehicle, the system may also provide for real time correction of vehicle speed and feed rate to adjust for changing conditions.

SUMMARY OF THE INVENTION

In the practice of the present invention, a comprehensive accurate feed rate monitoring and control system and method includes a central programmable controller mounted in the feed truck or other vehicle into which is input specific information for each pen and associated feed bunk. This information includes the pen number, the length of the bunk, and any unusual pen configuration and other data which, in general, does not change from day to day. Additional information which is input prior to each feeding session includes the ration proportions and the amount of feed to be distributed in each bunk. The amount of feed to be distributed may depend upon whether any feed remains in the bunks from prior feedings. A sensor or a plurality of sensors can be mounted on the bunks so that it can be remotely determined, via electromagnetic or ultrasonic senders and receivers or the like, whether feed remains in the bunks, and/or the quantity of any such remaining feed. The computer then calculates initial set points for vehicle speed and/or discharge door openings for each bunk, taking into account the bunk length and any special pattern feeding due to pen configuration. These desired set points are displayed to the driver so that door position and vehicle speed can be manually set. This system can be readily installed in existing vehicles at relatively low cost.

Alternatively, in addition to displaying the set points to the driver, the system can be enhanced such that controller generated set points can be used to directly control a vehicle speed governor, and/or a discharge door actuator. In such an enhanced system, the feed vehicle can include an accurate ground speed sensor or other vehicle position sensor, which can be, for example, a magnetic sensor sensing front axle revolutions, and an accurate feed rate sensor, which can be a load cell sensor mounted on the feed chute itself. Alternatively, a sensor, such as a radar emitter or the like, can be mounted on the feed bunk to determine the distance of the vehicle from the end of the bunk. This distance can be sent to the vehicle via radio or ultrasonic transmitters, etc.

Once a feed run is commenced along a specific bunk, the computer provides repetitive or real time monitoring of vehicle speed and/or position as well as feed rate, constantly recalculating the amount remaining to be fed and the length remaining to the end of the bunk. These parameters, which can be updated as often as 20 times per second, are then used to update and adjust the set points for vehicle speed and/or discharge door opening. The result is an even distribution of the assigned pen feed amount throughout the length of each bunk but compensated for variations in pen configuration and bunk length. The enhanced system virtually eliminates the need for specialized driver training, permitting an inexperienced driver to distribute feed virtually as uniformly as one with years of experience.

OBJECTS AND ADVANTAGES OF THE PRESENT INVENTION

The objects and advantages of the present invention include: providing an accurate livestock feed rate monitoring and control system and method; providing such a system which compensates for pen configurations and varying feed bunk lengths; providing such a system which provides accurate set point data to a vehicle driver based upon length of feed bunk, pen configuration and amount of feed to distribute in that bunk; to provide an enhanced system which includes monitoring of feed rate and feed vehicle speed or position, updated several times per second; providing such an enhanced system which provides repetitive or real time monitoring of the amount of feed left to feed to the current bunk and the remaining distance to the end of that bunk; providing such a system which repeatedly calculates a desired feed rate based upon the amount of feed remaining to feed and the bunk length remaining; providing such a system which automatically displays and/or controls desired vehicle speed and/or feed rates; providing such a method for displaying set points which will allow for uniformly and consistently distributing an assigned feed ration throughout each bunk of a feedlot, while compensating for pen configuration and bunk length; providing such a method for directly and repetitively controlling one or more feed distributing rate parameters, such as vehicle speed or feed flow, based upon repetitive or real time monitoring of feed amount remaining and vehicle position; to provide such a method which will insure the uniform and consistent distribution of an assigned feed ration throughout each bunk of a feedlot, while compensating for pen configuration and bunk length; and providing such a system and method which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 6 is a logical flow chart illustrating the active monitoring and feed control algorithm of the system while the vehicle is making a feed run.

DETAILED DESCRIPTION OF THE PREFERRED EMBODIMENTS

I. INTRODUCTION AND ENVIRONMENT

Figure 1:
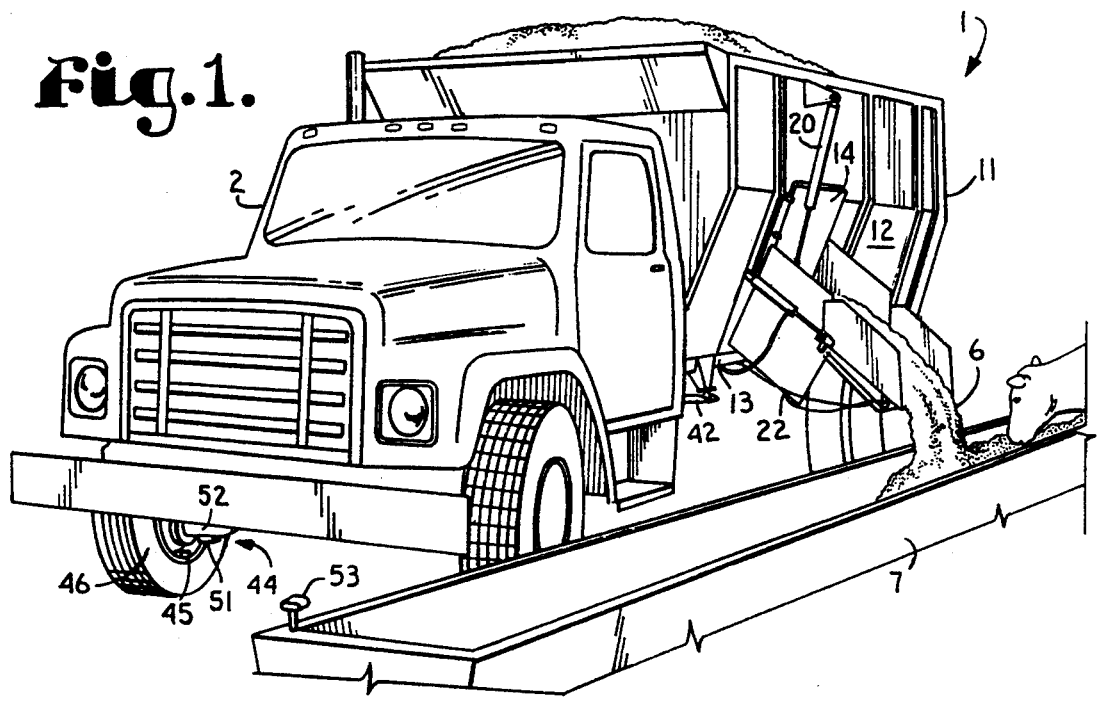
FIG. 1 is a perspective view of a feed distributing truck equipped with an accurate monitoring and control system and method for a livestock feeding operation in accordance with the present invention.

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. Said terminology will include the words specifically mentioned derivatives thereof and words of similar import.

Figure 2:
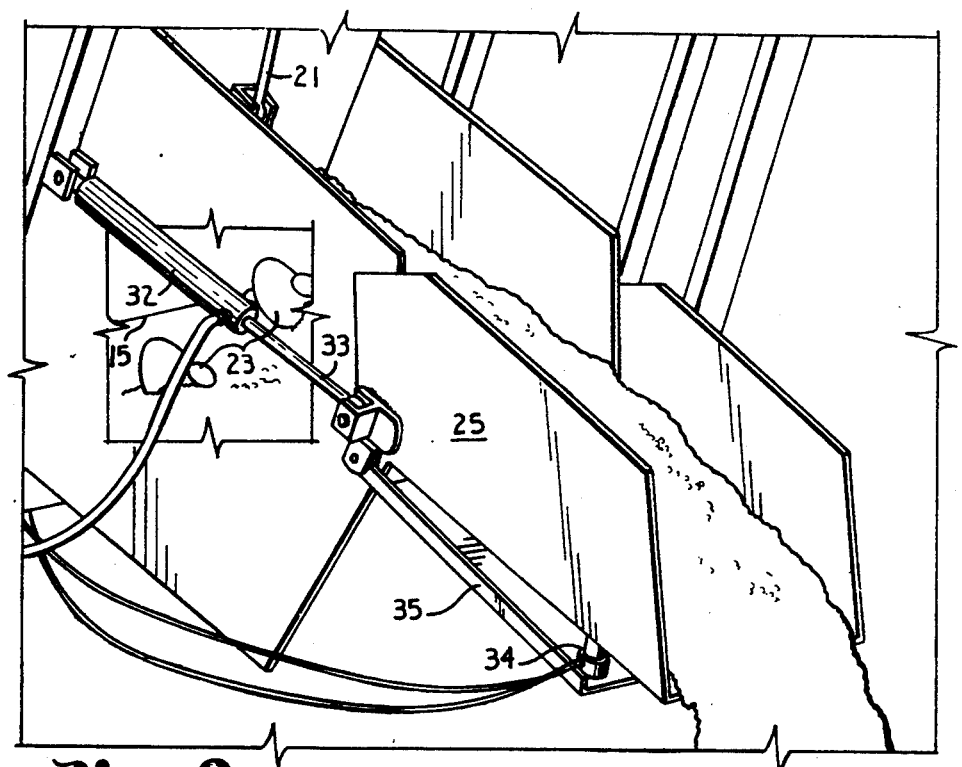
FIG. 2 is an enlarged perspective view of a feed chute and feeder in the truck of FIG. 1, with portions broken away to illustrate the feed augers and hydraulically operated chute door.

Referring to the drawings in more detail, reference numeral 1 in FIG. 1 generally designates a typical feed truck equipped with a feed monitoring and control system in accordance with the present invention. The feed truck 1 includes a cab 2 within which is a system CPU 3, display 4 and control keyboard or other input device 5 (FIG. 3) mounted for use by a driver. Referring to FIGS. 1 and 2, the truck 1 is shown distributing feed 6 to a feed bunk 7. The truck 1 includes a hopper 11 with side walls 12 attached to a truck body 13. A hopper door 14 covering an opening 15 is selectively opened and closed via a hydraulic cylinder 20 and attached piston rod 21. A three sided feed box 22 surrounds the opening 15 and includes a pair of feed augers 23 which draw feed from the opening 15 up to and out of the top of the box 22. A drop chute 25 is pivotably attached to the top of the box 22 via hinges 31, with the drop chute 25 being selectively raised and lowered hydraulically via cylinder 32 and piston rod 33.

To implement a repetitive or real time monitoring of feed flow rate, a pair of weight sensing elements 34 can be attached to the chute 25, with one shown in FIGS. 1 and 2. The sensing elements 34 are attached between the bottom of the chute 25 and a load sensing plate 35 which is attached at one end to the piston rod 33 and pivotally attached to the feed box 22, with the chute 25 also being pivotable relative to the plate 35. The sensing elements 34 can be load cell sensors constrained to detect additional weight in the chute 25 via a pressure differential between the chute 25 and the load sensing plate 35 caused by the weight of feed 6 on the chute 25. The sensors 34 then output an electric signal proportional to the weight, which signals are analog to digital converted via A/D convertor 41 and they are input to the CPU 3. In addition, a number of load cells 42, of which one is shown in FIG. 1, are positioned at the corners of the hopper 11 in known fashion to give a static readout of the hopper weight and thus the amount of feed ration remaining. The output of the load cells 42 is also output to the CPU 3 via an A/D convertor 43. The CPU 3 thus has two sources of information regarding feed amount remaining and feed flow rate, which can be cross-checked for enhanced reliability.

For more precise control, the truck 1 can also be equipped with a ground speed sensor or vehicle position sensor 44, which is shown as a magnet 45 attached to the inside of the right front wheel 46, with a magnetic sensor element 51 attached beneath the front axle 52 and in close proximity to the magnet 44. The magnetic sensor element 51 thus senses the magnet 45 once per wheel revolution and outputs a signal to the CPU 3 with each revolution, which signals are accumulated and multiplied by the outside tire diameter to determine the distance traversed and differentiated to determine the truck ground speed. As an alternative to, or in addition to sensing vehicle speed and deriving vehicle position therefrom, a sensor, such as the radar detector 53 shown in FIG. 1, can be mounted at the end of the bunk 7 to directly sense the presence and the position of the truck 1. This position can be remotely sent to the CPU 3 via radio waves or the like. Other alternative position or speed sensors include GPS or Loran sensors mounted on the truck 1 which can directly detect vehicle position.

Figure 3:
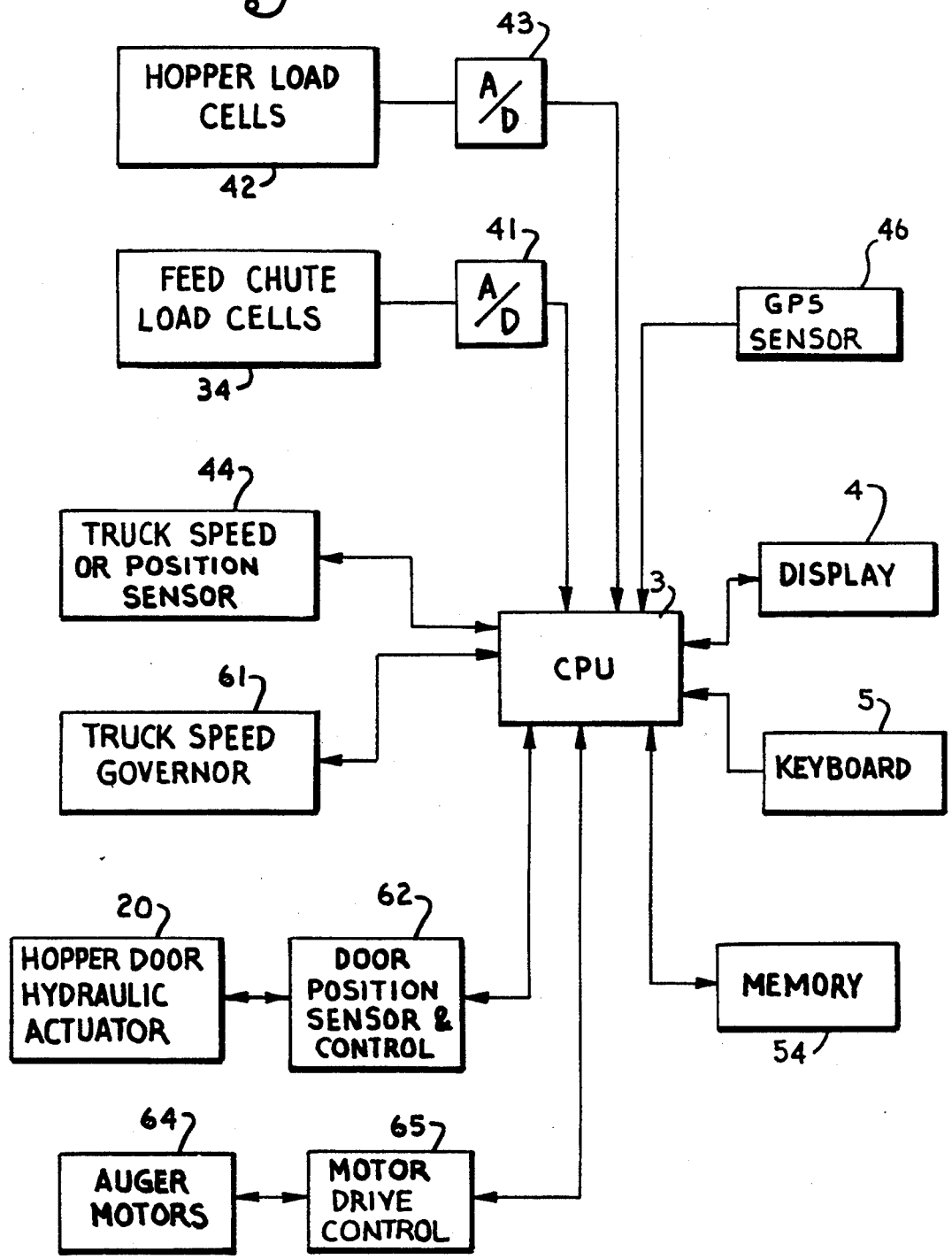
FIG. 3 is a schematic block diagram of the accurate feed monitoring and control system.

Referring to FIG. 3, the feed monitoring and control system is illustrated in block diagram form. The CPU 3, display 4, and keyboard or other input device 5 are conventional components which are usually mounted in the cab 2 of the truck 1. A memory 54 is associated with the CPU 3, and can include conventional memory elements including hard wired memory chips, hard disc drives and/or floppy disc drives. The CPU 3 can be connected to the hopper load cells 42 via the A/D convertor 43, and to the feed chute load cell sensors 34 via the A/D convertor 41. The CPU 3 is programmed to calculate both a current feed rate and an amount remaining to feed from each of these inputs. The feed chute load cells 34 are relied upon primarily as a feed rate monitor, with a feed rate differentiated from the hopper load cell readouts used merely as a redundancy check. For example, the CPU 3 can be programmed to compare the feed amount remaining, as calculated by integrating the outputs from the feed chute load cells 34, with the feed amount remaining as indicated directly by the hopper load cell readouts. In the event that the two values differ by more than a set amount, a system alarm is visually or aurally provided to the driver.

The truck speed or position sensor 44 is connected to the CPU 3 to provide a signal from which the vehicle distance traveled and ground speed can be calculated. A digitally controlled truck speed governor 61 is connected to the CPU 3 to directly control the speed of the truck 1 for precise feeding operations. The hopper door hydraulic double acting cylinder actuator 20 is connected to the CPU 3 via a door position sensor and solenoid control circuit 62. For example, the sensor within the circuit 62 can constitute a rheostat within the hydraulic double acting cylinder 20 which senses the position of the piston 21 therein and provides an electrical resistance readout indicative of the position of the hopper door 14 within the hopper opening 15 to the CPU 3. The control of the hydraulic cylinder 20 can be accomplished by the CPU 3 via conventional solenoids in the circuit 62 which are opened or closed via electrical signals to supply hydraulic fluid to either side of the double acting cylinder 20. A pair of variable speed auger motors 64 are connected to the CPU 3 via a motor drive control circuit 65. The drive control circuit 65 can constitute a variable amplifier which is controllable to vary the speed of the auger motors 64, and thus the feed rate of feed out of the feed box 22.

Figure 4:
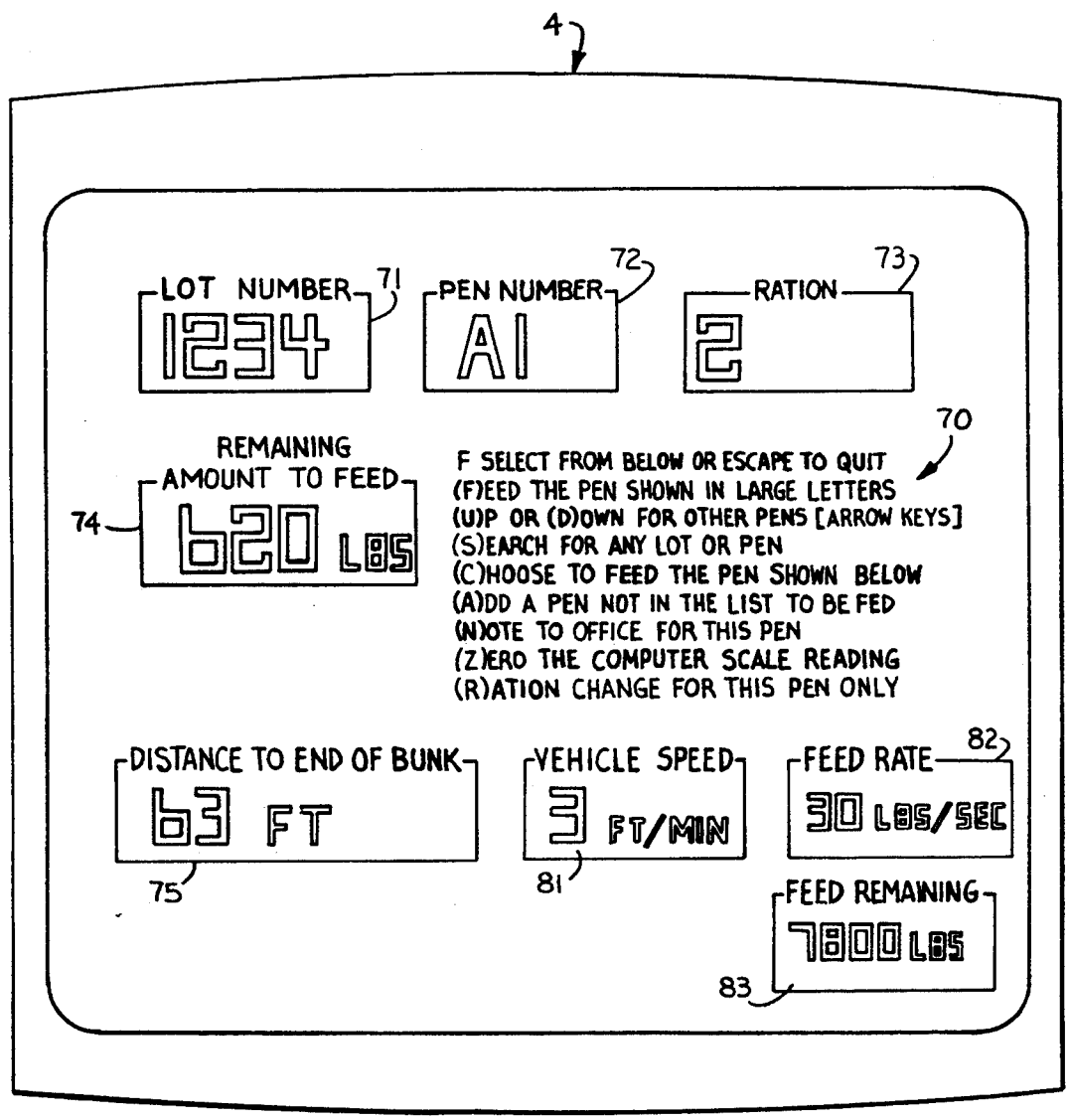
FIG. 4 is an illustration of a computer screen upon which are displayed system parameters to a vehicle driver during a feed run.

FIG. 4 is a frontal view of the display 4 with a number of variable system parameters displayed and a sample keyboard selection chart 70. The parameters displayed include the lot number in window 71, for identification purposes, and, in window 72, the pen number, which is a reference for the particular pen currently being serviced. In window 73, the ration number is indicated, which number indicates the appropriate feed mix for the pen being serviced. In window 74, the remaining amount to feed is an indication of the feed amount, in lbs., which remains to be fed in the current bunk 7. Below, in window 75, the distance to end of bunk 7, in feet, is displayed, while the current vehicle speed, in feet per minute, is indicated in window 81. The current feed rate, in lbs. per second, is indicated in window 82, while the feed amount remaining, which represents the total feed remaining on the truck in lbs., is displayed in window 83.

II. OPERATION AND LOGICAL FLOW DIAGRAMS

Figure 5:
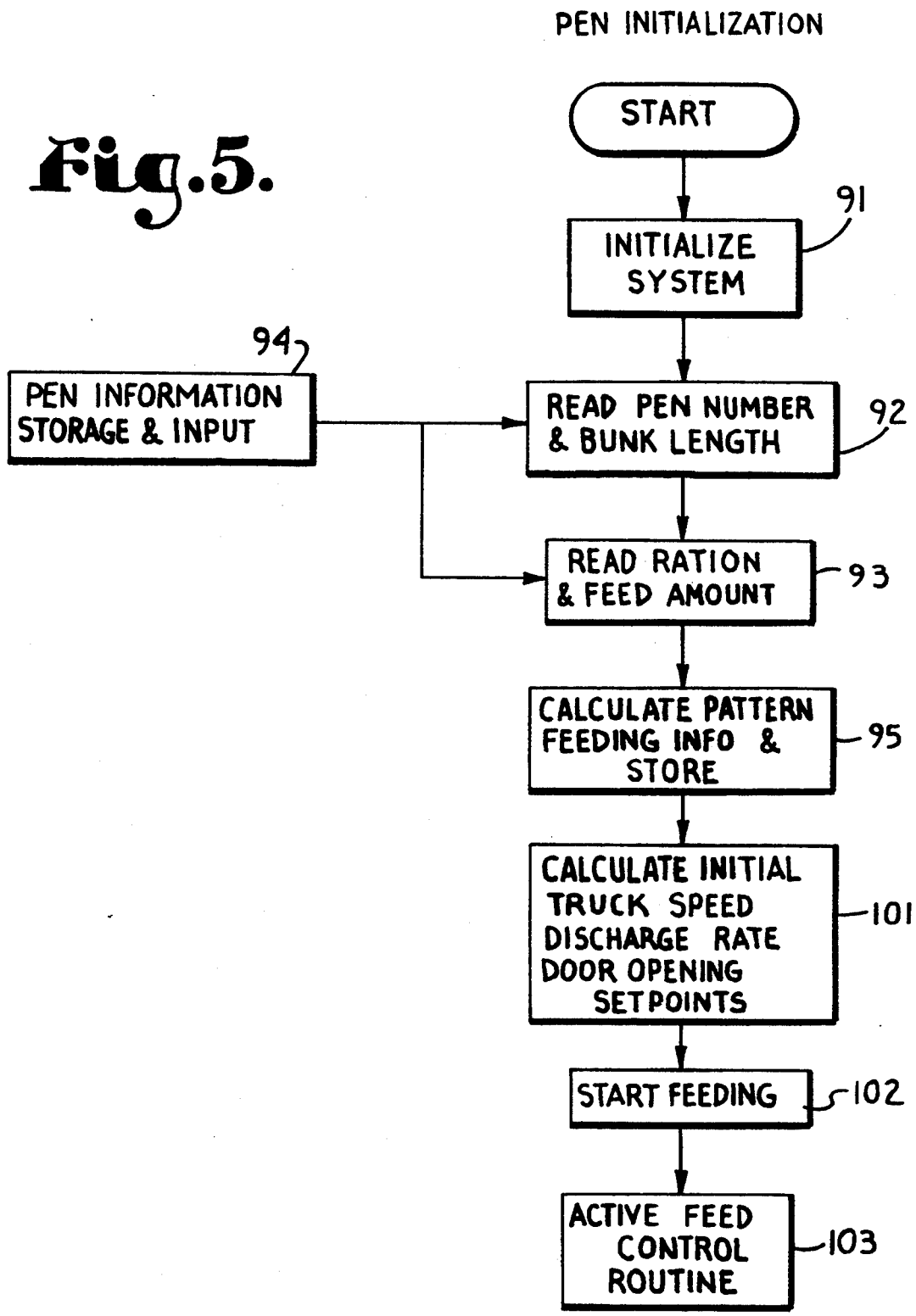
FIG. 5 is a logical flow chart illustrating the initial setup of the control system prior to the vehicle making a feed run.

FIGS. 5 and 6 are logical flow diagrams indicating the monitoring and control algorithms accomplished by the CPU 3 with each feed cycle.

Referring to FIG. 5, an initialization routine is implemented prior to feeding each pen. At block 91, the CPU and each peripheral device is initialized upon startup. At block 92, the pen number is read into the CPU memory along with the length of the feed bunk associated with that pen. Typical feed bunk lengths range from 60 to 200 feet. At block 93, the ration type and amount is input into CPU resident memory. Ration types and pen feed amounts are generally updated on a daily basis when a supervisor makes the rounds of the pens and notes growth progress and any changes in the numbers or make-up of the animals in each pen. This process is often called "calling the bunks", and the data generated thereby is stored on a floppy disc or other portable storage device and then loaded into each truck CPU 3. Thus block 94 represents the input of relatively constant information such as pen number and bunk length, which may be stored in a hard drive, and information such as ration and feed amount, which can change daily, from a floppy disc or other portable storage device, into resident memory of the CPU 3.

At block 95, any pattern feeding information is calculated by the CPU and stored. This calculation is performed when a pen is irregular in shape, such as a right triangle, for example. In such a pen, although the feed bunk extends along one side of the triangle, cattle will be more numerous at one end of the bunk than at the other, in general proportion to the depth of the pen at each section of the bunk. Thus, feed must be concentrated toward the deep end of the bunk, with the amount of feed tapering off toward the narrow end. In these instances, the CPU 3 takes the total feed amount allocated to the pen and calculates a proportional distribution to accommodate the irregular pen shape, with more feed distributed at the deeper sections of the pen.

At block 101, initial set points are calculated for truck speed, discharge rate, e.g. speed of the auger motors 64, and the position of the hopper door 14. In order to simplify the calculation, truck speed and discharge rate can be set at constant values for certain feed rate ranges, with the door opening position being calculated based upon those preset values and the specific desired feed rate. Of course, any two of the three variables can be preset for a given feed rate range, with the third variable calculated.

At block 102, the truck is configured for the calculated set points as it reaches one end of the bunk 7, as, depending upon the sophistication of the system, the CPU 3 either directly controls the speed, auger motor speed and door opening position, or displays the desired values to the driver via the display 4, with the driver manually manipulating the controls. In a more basic system, this may end the routine, or a repetitive check can be accomplished to update the driver's displayed set points one-third or one-half of the way down the bunk, for example.

In the optional, enhanced system, block 103 represents the active feed control routine, as shown in FIG. 6. Referring to FIG. 6, at block 104, the truck 1 begins moving along the bunk 7, distributing feed at the initial set point rate, as displayed in the display window 82. At block 105, the system checks for a manual override, which the driver would input via the keyboard 5, for example. If the manual override is on, the active feed routine is ended. If no manual override is detected, while the truck 1 is moving, the CPU 3 constantly samples the truck ground speed or position, via the speed or position sensor 44 at block 105, and recalculates the distance to the end of the bunk 7 based thereon, at block 106. Simultaneously, in real time, the CPU 3 senses the feed rate via the feed chute sensors 34 and/or the hopper load cells 42 at block 111, and calculates both the amount fed in this bunk at block 112 and the amount remaining to feed in the bunk at block 113. The CPU 3 also does a comparison each time the amount remaining to be fed is calculated, and, if this is equal to zero, stops feeding and resets, as indicated at block 114, which entails a return to the top of FIG. 5 to initialize the truck for the next scheduled pen. If the amount remaining to be fed is greater than zero, then, at block 115, a new feed rate is determined by dividing the bunk length remaining by the amount of feed remaining to feed in this bunk, and the vehicle speed, door opening, and/or auger motor speeds are adjusted to new set points to adjust for the newly calculated feed rate. At block 115, if pattern feeding is needed, the CPU 3 also accommodates for stored pattern feeding criteria by comparing the truck position in the bunk with stored pattern criteria for that location and adjusts the feed rate accordingly. Depending upon the computing speed of the CPU 3, this active feed control algorithm, as represented by FIG. 6, is repeated up to 20 times per second, so that constant adjustments are made to accommodate for variables such as road conditions, moisture in the feed, driver performance, etc. The total amount of feed remaining on the truck 1, as displayed in the display window 83, also has an effect upon feed rate due to the lessening effects of gravity as the hopper 11 empties. Each of these variables is automatically accounted for in the active feed control algorithm.

The benefits for a feedlot operation provided by the inventive system include the provision of an even distribution of the assigned feed amount throughout the length of each bunk 7 while compensating for variations in pen configuration and bunk length. The system ends the need for the truck drivers to back up and retrace portions of their feed route, with the consequent increased time and fuel consumption and the increased maintenance expenses which this entails. In addition, again, the system virtually eliminates the need for specialized driver training, permitting an inexperienced driver to distribute feed virtually as uniformly as one with years of experience.

While the inventive feed monitoring and control system has been illustrated and described for use in a livestock feeding operation, it is not so limited. The monitoring and control system is equally useful in feeding operations for aquatic fish hatcheries or farms, where many of the same feeding requirements apply. Other contemplated uses include the distribution of seed or fertilizer in agricultural operations, salt or other freezing level reducing agents on roadways, or any other distribution of feed or granular material where an even distribution of material per given length is desired.

In addition, while specific truck speed and flow rate sensors have been described, it should be noted that other types of sensors could be used as well. For example, a global positioning sensor or a loran based sensor can be used to detect truck ground speed and position, and an infrared or ultrasonic based flow rate sensor or other motion detector can be used to detect the rate of flow of feed from the truck 1. Instead of feed transfer augers, other feed distribution systems could be used as well. In addition, while the system has been shown mounted in a truck 1, it would be equally useful in an agricultural tractor or the like pulling a feed distributing wagon.

It is to be understood that while certain forms of the present invention have been illustrated and described herein, it is not to be limited to the specific forms or arrangement of parts described and shown.

What is claimed and desired to be secured by Letters Patent is as follows:

1. A material monitoring and control system for evenly distributing material along a path from a moving vehicle, the system comprising:
   (a) means for storing the length of said path remaining to be traveled;
   (b) means for storing the amount of said material remaining to be distributed along said path;
   (c) a programmable controller means for calculating desired set points for one or more distribution rate parameters based upon said remaining path length and said remaining material amount and also outputting said desired set points wherein said vehicle can be configured thereby, said programmable controller means being connected to said means for storing path length remaining and said means for storing material remaining;
   (d) flow rate sensing means for detecting the flow rate of said material from the vehicle;
   (e) vehicle position detecting means for detecting the position of said vehicle along said path; and
   (f) said programmable controller means is connected to said flow rate sensing means and said position detecting means, said programmable controller means providing a repetitive indication of a said distribution rate determining parameter based upon feedback from said flow rate sensing means and said position detecting means.

2. A material monitoring and control system as in claim 1, wherein:
   (a) said controller is programmed to repeatedly update, on a real time basis, the distance remaining to travel along said path based upon feedback from said vehicle position detecting means.

3. A material monitoring and control system as in claim 2, wherein:
   (a) said controller is programmed to repeatedly update, on a real time basis, the amount of material remaining to be distributed along said path based upon feedback from said flow rate sensing means.

4. A material monitoring and control system as in claim 3, wherein:
   (a) said controller is programmed to repeatedly calculate and update, on a real time basis, the desired flow rate required to evenly distribute the remaining material along the remaining path distance.

5. A material monitoring and control system as in claim 1, wherein:
   (a) said distribution rate determining parameter is vehicle speed.

6. A material monitoring and control system as in claim 1, said vehicle including a hopper with a variable discharge opening, said system further comprising:
   (a) discharge opening setting means for selectively setting said discharge opening.

7. A material monitoring and control system as in claim 6, wherein:
   (a) said discharge opening setting means is connected to said controller; and
   (b) said distribution rate determining parameter is discharge opening amount.

8. A material monitoring and control system as in claim 1, wherein:
   (a) said means for storing remaining path length and said means for storing remaining material amount are repetitively updated as said vehicle traverses said path; and
   (b) said means for calculating recalculates said set points with each said update.

9. A material monitoring and control system as in claim 1, wherein:
   (a) said material is animal feed and said path is along an enclosure containing animals to be fed.

10. A material monitoring and control system as in claim 9, wherein:
    (a) said feed is livestock feed and said enclosure is a livestock pen with a feed bunk associated therewith; and (b) said path is the length of said feed bunk.

11. A material monitoring and control system as in claim 10, wherein said vehicle includes a feed hopper with a hopper feed chute and wherein:
(a) said flow rate sensing means comprises a weight sensing means attached to said chute to sense the weight of feed therein.

12. A material monitoring and control system as in claim 11, wherein:
(a) said vehicle position sensing means includes a magnet attached to a wheel of said vehicle and a magnetic sensor mounted adjacent said wheel to sense wheel revolutions as said magnet rotates with said wheel.

13. A material monitoring and control system as in claim 11, wherein:
(a) said vehicle position sensing means includes a radar detector attached to the feed bunk to directly determine the distance of the vehicle from the end of the bunk.

14. A material monitoring and control system as in claim 10, wherein:
(a) said controller is programmed to compute pattern feeding criteria for altering the distribution of feed along said feed bunk to compensate for irregularities in pen shape or configuration.

15. A material monitoring and control system as in claim 14, wherein:
(a) said controller is programmed to selectively alter the even distribution of feed along said bunk based upon the position of said vehicle along said bunk and said pattern feeding criteria.

16. A method of distributing material from a moving vehicle evenly along a path to be traveled by said vehicle, said method comprising the steps of:
(a) storing the path length remaining;
(b) storing the amount of material remaining to be distributed along said path; and
(c) controlling at least one material distributing rate parameter based upon the path length remaining to be traveled and the amount of material remaining to be distributed;
(d) accurately monitoring the flow rate of material from the vehicle and repeatedly calculating the amount of material remaining to distribute based upon the flow rate over time;
(e) accurately monitoring the position of said vehicle along said path;
(f) repeatedly calculating the distance remaining to be traveled along said path based upon said vehicle position; and
(g) repeatedly changing said at least one material distributing rate parameter each time the path length remaining to be traveled and the amount of material remaining to be distributed are recalculated.

17. A method as in claim 16, wherein said vehicle position monitoring step includes the steps of:
(a) attaching a Global Positioning Sensor to said vehicle;
(b) reading out the vehicle position from said Global Positioning Sensor; and
(c) translating said vehicle position readout into said position along said path.

18. A method as in claim 17, wherein said controlling step includes the step of:
(a) controlling the speed of said vehicle.

19. A method as in claim 17, wherein said controlling step includes the step of:
(a) controlling the rate of distribution of feed per unit time.

20. A method as in claim 17, wherein said controlling step includes:
(a) controlling the opening of a variable discharge opening on a material containing hopper on said vehicle.

21. A method as in claim 17, and further including the steps of:
(a) calculating a pattern feeding criteria based upon irregularities in the shape or configuration of said pen; and
(b) selectively altering the even distribution of feed along said bunk based upon the position of said vehicle along said bunk and said pattern feeding criteria.

22. A method as in claim 17, wherein said controlling step includes the step of:
(a) controlling one or both of the following parameters:
(i) the speed of said vehicle; and
(ii) the opening of a variable discharge opening on a feed containing hopper on said vehicle.

23. A method as in claim 16, wherein said controlling step includes the step of:
(a) controlling the speed of said vehicle.

24. A method as in claim 16, wherein said controlling step includes the step of:
(a) controlling the rate of distribution of material per unit time.

25. A method as in claim 24, wherein said controlling step includes:
(a) controlling the opening of a variable discharge opening on a material containing hopper on said vehicle.

26. A feed monitoring and control system for evenly distributing livestock feed along an elongate feed bunk from a moving feed distributing vehicle, the system comprising:
(a) means for storing the length of said feed bunk remaining to be traveled by said vehicle;
(b) means for storing the amount of feed remaining to be distributed to said bunk;
(c) flow rate sensing means for detecting the flow rate of said feed from the vehicle;
(d) vehicle position detecting means for detecting the position of said vehicle along said bunk; and
(e) programmable controller means for calculating desired set points for one or more distribution rate parameters based upon said remaining path length and said remaining material amount and for outputting said desired set points wherein said vehicle can be configured thereby, said programmable controller means being connected to said means for storing bunk length remaining, said means for storing feed remaining, said flow rate sensing means and said vehicle position detecting means, said programmable controller means providing a repetitive indication of a said distribution rate determining parameter based upon feedback from said flow rate sensing means and said position detecting means.

27. A feed monitoring and control system as in claim 26, wherein:
(a) said distribution rate determining parameter is vehicle speed.

28. A feed monitoring and control system as in claim 26, wherein:
(a) said controller is programmed to repeatedly update, on a real time basis, the distance remaining to travel along said bunk based upon feedback from said vehicle position detecting means.

29. A feed monitoring and control system as in claim 28, wherein:
(a) said controller is programmed to repeatedly update, on a real time basis, the amount of feed remaining to be distributed along said bunk based upon feedback from said flow rate sensing means.

30. A feed monitoring and control system as in claim 29, wherein:
(a) said controller is programmed to repeatedly calculate and update, on a real time basis, the desired flow rate required to evenly distribute the remaining feed along the remaining bunk distance.

31. A feed monitoring and control system as in claim 26, wherein said vehicle includes a feed hopper with a hopper feed chute and wherein:
(a) said flow rate sensing means comprises a weight sensing means attached to said chute to sense the weight of feed therein.

32. A feed monitoring and control system as in claim 26, wherein:
(a) said bunk is positioned adjacent to a livestock pen.

33. A feed monitoring and control system as in claim 32, wherein:
(a) said controller is programmed to compute pattern feeding criteria for altering the distribution of feed along said feed bunk to compensate for irregularities in pen shape or configuration.

34. A feed monitoring and control system as in claim 33, wherein:
(a) said controller is programmed to selectively alter the even distribution of feed along said bunk based upon the position of said vehicle along said bunk and said pattern feeding criteria.

35. A feed monitoring and control system as in claim 26, said vehicle including a feed hopper with a variable discharge opening, said system further comprising:
(a) discharge opening setting means for selectively setting said discharge opening.

36. A feed monitoring and control system as in claim 35, wherein:
(a) said discharge opening setting means is connected to said controller; and
(b) said distribution rate determining parameter is discharge opening amount.

37. A feed monitoring and control system as in claim 26, wherein said vehicle position detecting means is a satellite based positioning system.

38. A feed monitoring and control system as in claim 37, wherein said satellite based positioning system is a Global Positioning System.

39. A feed monitoring and control system for evenly distributing livestock feed along an elongate feed bunk from a moving feed distributing vehicle, the system comprising:
(a) programmable means for repeatedly calculating and for storing the length of said feed bunk remaining to be traveled by said vehicle as said vehicle traverses said bunk;
(b) means for repeatedly calculating and storing the amount of feed remaining to be distributed to said bunk; and
(c) said programmable means is programmed to repeatedly calculate desired set points for one or more distribution rate parameters based upon said remaining path length and said remaining material amount and to output each said desired set point wherein said vehicle can be repeatedly configured thereby.

40. A feed monitoring and control system as in claim 39, wherein:
(a) said controller is programmed to compute pattern feeding criteria for altering the distribution of feed along said feed bunk to compensate for irregularities in pen shape or configuration or cattle feeding habits.

41. A feed monitoring and control system as in claim 40, wherein:
(a) said controller is programmed to selectively alter the even distribution of feed along said bunk based upon the position of said vehicle along said bunk and said pattern feeding criteria.

42. A method of evenly distributing feed from a feed distributing vehicle along a feed bunk extending a certain length alongside and adjacent to a feeding pen containing a number of livestock to be fed, said method comprising the steps of:
(a) storing the bunk length;
(b) storing the total amount of feed to be distributed along said bunk;
(c) calculating the position of said vehicle along said bunk and calculating the bunk length remaining to be traveled from said vehicle position;
(d) sensing the amount of feed distributed and calculating the amount of feed remaining to be distributed along said bunk; and
(e) controlling at least one feed distributing rate parameter based upon the bunk length remaining to be traveled and the amount of feed remaining to be distributed.

43. A method of evenly distributing feed from a feed distributing vehicle along a feed bunk extending a certain length alongside and adjacent to a feeding pen containing a number of livestock to be fed, said method comprising the steps of:
(a) storing the bunk length;
(b) storing the total amount of feed to be distributed along said bunk; and
(c) controlling at least one feed distributing rate parameter based upon the path length remaining to be traveled and the amount of feed remaining to be distributed;
(d) accurately monitoring the flow rate of feed from the vehicle and repeatedly calculating the amount of feed remaining to distribute based upon the flow rate over time;
(e) accurately monitoring the position of said vehicle;
(f) repeatedly calculating the distance remaining to be traveled along said bunk based upon said vehicle position; and
(g) repeatedly changing said at least one feed distributing rate parameter each time the path length remaining to be traveled and the amount of feed remaining to be distributed are recalculated.

44. A feed monitoring and control system for evenly distributing livestock feed along an elongate feed bunk from a moving feed distributing vehicle, the system comprising:
(a) programmable means for computing and storing pattern feeding criteria for altering the distribution of feed along said feed bunk to compensate for irregularities in pen shape or configuration or cattle feeding habits and for storing the position of said vehicle along said feed bunk;

(b) controllable distribution means on said vehicle for selectively controlling the rate of distribution of feed, said distribution means being connected to said programmable means, said programmable means being programmed to selectively cause said distribution means to alter the even distribution of feed along said bunk based upon the position of said vehicle along said bunk and said pattern feeding criteria.

45. A method of distributing feed from a feed distributing vehicle along a feed bunk extending a certain length alongside and adjacent to a feeding pen containing a number of livestock to be fed, said method comprising the steps of:
  (a) storing the bunk length;
  (b) computing pattern feeding criteria for altering the distribution of feed along said feed bunk to compensate for irregularities in pen shape or configuration or cattle eating habits;
  (c) storing the position of said vehicle along said feed bunk;
  (d) selectively altering the distribution of feed along said bunk based upon the position of said vehicle along said bunk and said pattern feeding criteria. A1 An optional GPS sensor 46 mounted on the truck 1 is connected to the CPU 3 to provide position sensing for the truck 1.

* * * * *